R. E. HELLMUND.
PHASE CONVERTING SYSTEM.
APPLICATION FILED JULY 5, 1917.

1,381,303.

Patented June 14, 1921.
4 SHEETS—SHEET 1.

WITNESSES:
Fred. A. Lind.
D. C. Davis

INVENTOR
Rudolf E. Hellmund
BY
Wesley G. Carr
ATTORNEY

R. E. HELLMUND.
PHASE CONVERTING SYSTEM.
APPLICATION FILED JULY 5, 1917.

1,381,303.

Patented June 14, 1921.
4 SHEETS—SHEET 2.

WITNESSES:
Fred A. Lind.
D. C. Davis.

INVENTOR
Rudolf E. Hellmund
BY
ATTORNEY

R. E. HELLMUND.
PHASE CONVERTING SYSTEM.
APPLICATION FILED JULY 5, 1917.
1,381,303.
Patented June 14, 1921.
4 SHEETS—SHEET 4.
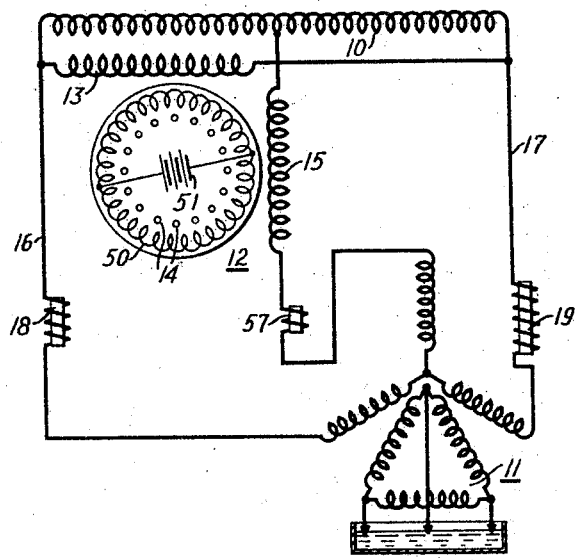
Fig. 5.
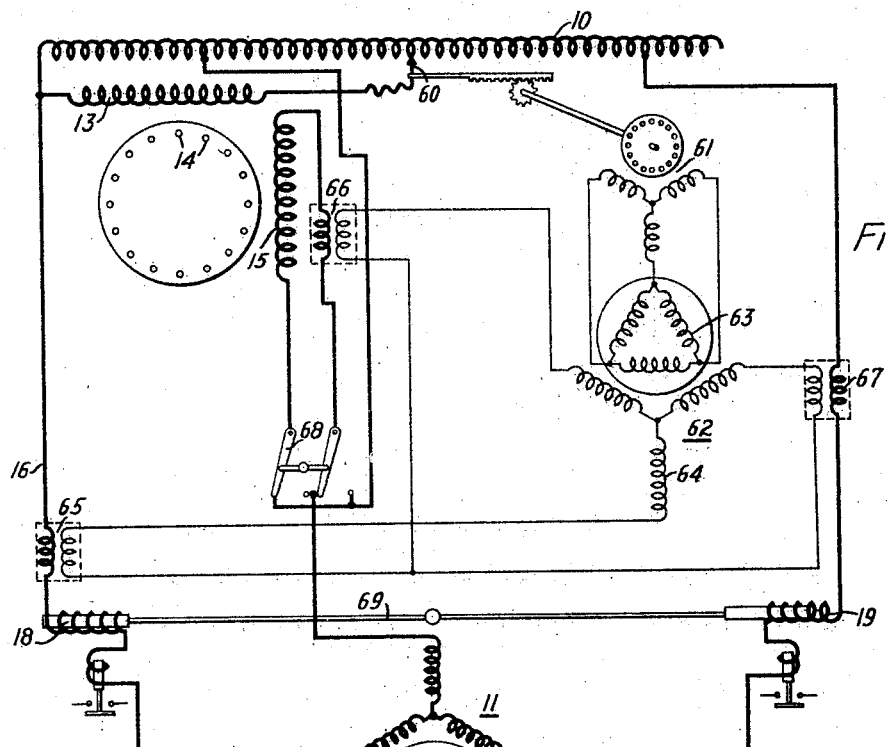
Fig. 6.
WITNESSES:
Fred. A. Lind.
D. C. Davis.
INVENTOR
Rudolf E. Hellmund
BY
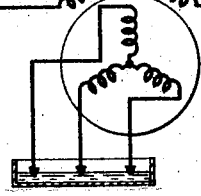
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

PHASE-CONVERTING SYSTEM.

1,381,303.  Specification of Letters Patent.  Patented June 14, 1921.

Application filed July 5, 1917. Serial No. 178,549.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Phase-Converting Systems, of which the following is a specification.

My invention relates to phase-converting systems of the type wherein energy from a single-phase alternating-current source is transformed into polyphase currents by means of a rotary phase converter, and it has for its main object to provide a system of the character designated whereby a substantial voltage balance may be maintained in the polyphase load circuit throughout wide load variations.

A further object of my invention is to provide a phase-converting system wherein the direction of phase rotation in the polyphase circuit may be reversed without disturbing the operation of instrument transformers, limit switches and other auxiliary apparatus associated therewith.

Other objects and details of my invention will hereinafter more fully appear.

Figure 1:
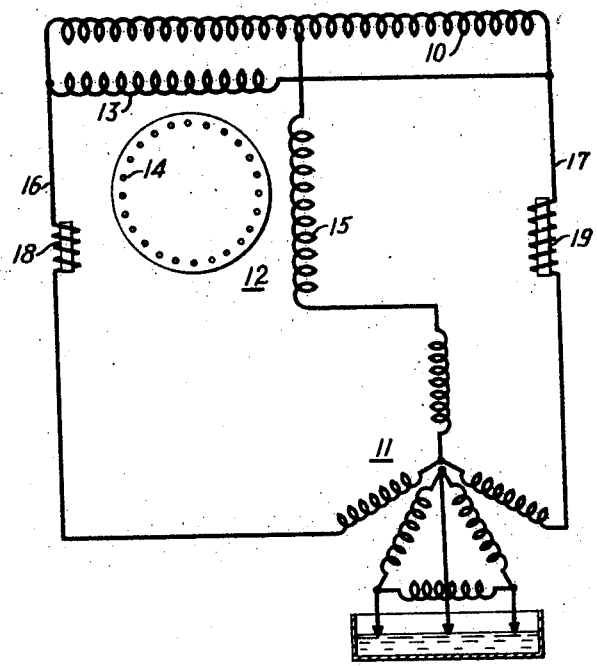
Figure 2:
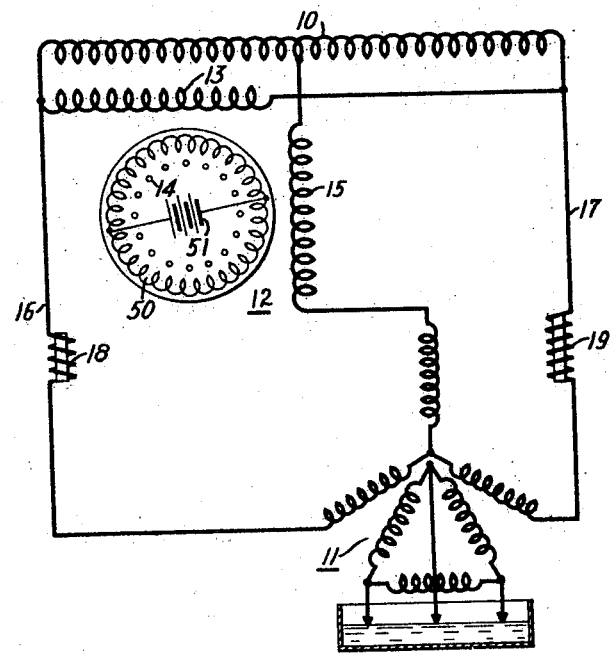
Figure 3:
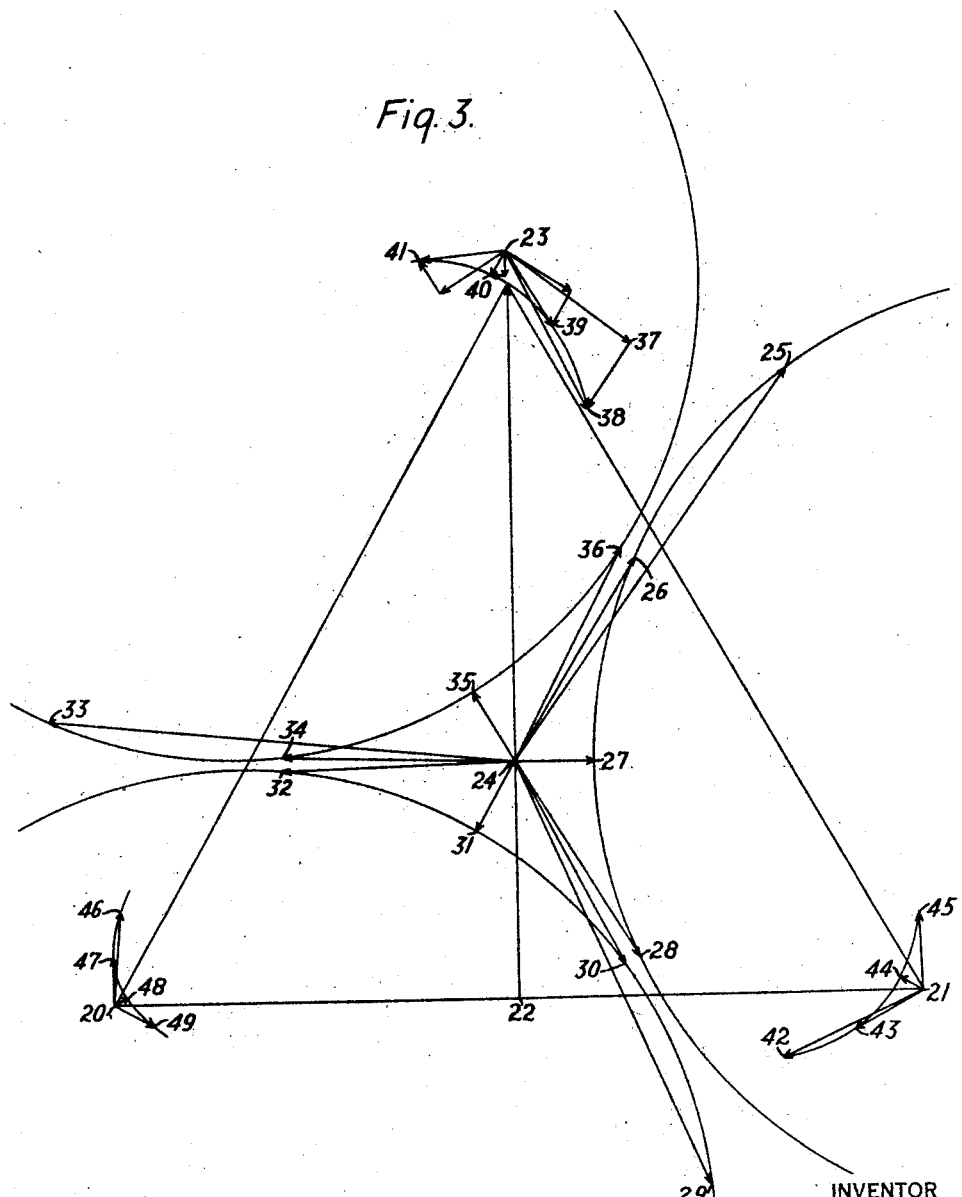
Figure 4:
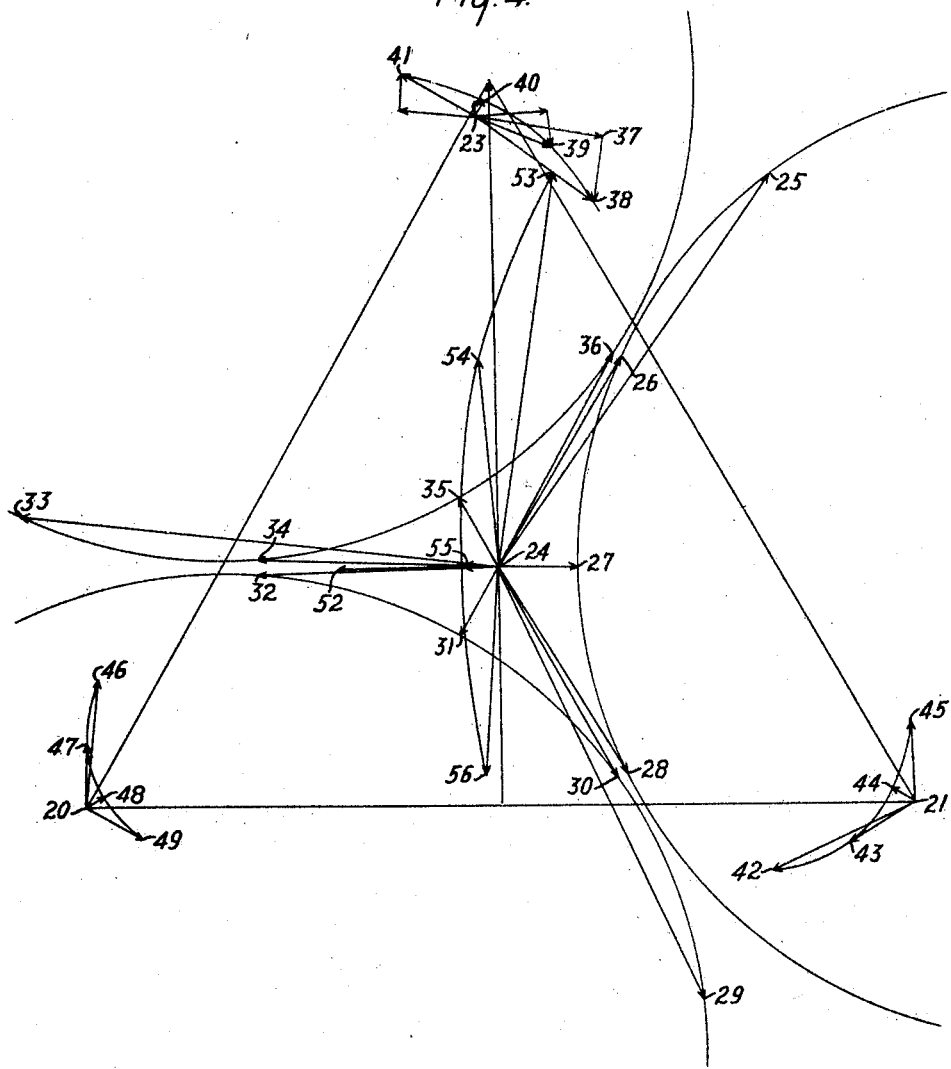

Referring to the drawing, Figure 1 is a diagrammatic view of a phase-converter system embodying a phase-balancing means inserted in two mains of the polyphase circuit, a phase converter of the asynchronous type being employed; Fig. 2 is a diagrammatic view of a system similar to Fig. 1 except that a phase-converter of the synchronous type is employed. Figs. 3 and 4 are vector diagrams illustrating the operation of the balancing means in the systems of Figs. 1 and 2, respectively; Fig. 5 is a diagrammatic view of a system similar to that of Fig. 2, phase-balancing inductances being shown in all the polyphase-circuit mains; and Fig. 6 is a diagrammatic view of a phase-converter system wherein are shown both means for maintaining a substantial balance over wide ranges of load change and means whereby the direction of phase rotation in the polyphase system may be conveniently reversed.

Phase-converter systems are well known in which a single-phase source of alternating current is arranged to supply a polyphase alternating-current system, certain mains of said system being connected directly to said source and an additional main of said system being connected to said source through a phase converter of the rotary type comprising an induction machine provided with a fixed primary winding, a rotatable secondary winding and a fixed tertiary winding electrically displaced with respect to said primary winding. In the operation of a system of this character, the action of the load currents flowing through the different windings of the phase converter is to produce certain inductive and resistance drops which reduce and distort the induced or tertiary phase-converter voltage, distorting and unbalancing the electromotive forces in the polyphase system.

In my U. S. Patents Nos. 1,242,936 and 1,242,937, issued Oct. 16, 1917, and assigned to the Westinghouse Electric & Manufacturing Company, I have disclosed and claimed means whereby the balance in the polyphase system may be much improved by the insertion of inductive reactance devices in the leads which are directly connected to the single-phase source and by providing certain mutual relations between said inductive devices.

In the systems described in the aforementioned applications, the reactances of the inductive devices in the different mains of the system were equal. I find that superior results may be obtained by employing reactive devices of unequal inductance in the different mains, said devices being arranged and distributed in different ways, as will hereinafter be more fully pointed out.

Referring to Fig. 1 of the drawing, I show a source of alternating current, such, for example, as a transformer winding at 10. A polyphase load device, such, for example, as an induction motor, is shown at 11 and is arranged to be energized from the single-phase source 10 by the aid of a phase-converter dynamo-electric machine 12 comprising a primary winding 13, a secondary winding 14 and a tertiary winding 15. The primary winding 13 is connected directly across a portion of the source 10. The secondary winding 14 is shown in the form of a squirrel-cage winding, mounted for rotation in electrical proximity to the winding 13, and the tertiary winding 15 is a stator winding also mounted in electrical proximity to the secondary winding 14 and in electrical quadrature to the primary winding 13. By so adjusting the relative number of turns in the different windings that the voltage induced in the tertiary winding 15 shall be substantially 87% of that impressed upon the primary winding 13, a three-phase electromotive force may be impressed upon the motor 11 in accordance with the Scott or T connection, as is well known in the art, two terminals of the motor 11 being connected directly to the terminals of the source 10 through mains 16 and 17 and the remaining terminal 11 being connected to substantially the mid-point of the source 10 through the tertiary winding 15.

With the circuit arrangement thus described, a substantially balanced three-phase electromotive force may be produced for application to the motor 11, under no-load conditions, the magnetizing current of the converter producing small drops but, as soon as load is imposed upon the motor 11, the cumulative effect of the resistance and reactive drops through the converter 12 is to reduce the magnitude and shift the phase of the electromotive force provided by the winding 15, thus unbalancing the electromotive forces at the motor 11. In order to compensate for this effect and to maintain substantial voltage balance at the load, throughout variations in the load current, I provide an inductive reactor 18 in the main 16 and a similar, though larger, inductive reactor in the main 17. The effect of the reactors 18 and 19 is to produce alternations in the magnitude and phase of the electromotive forces impressed upon the motor 11 so as to maintain balance thereat, as will be understood by reference to the vector diagram of Fig. 3.

Referring to this diagram, the electromotive force provided by the source 10 and impressed upon the primary winding 13 and also upon one phase of the load is represented by a vector 20—21, and the electromotive force produced in the tertiary winding 15 is represented, in phase and magnitude, by a vector 22—23, the length of the vector 22—23 preferably being somewhat more than 87% of the length of the vector 20—21. Thus, the triangle 20—21—23 represents approximately the polyphase electromotive force impressed upon the motor.

In accordance with the principles of the well known Heyland diagram for the induction motor, the load currents for one phase of the motor 11 may be represented by vectors radiating from a central point 24 and having their terminals lying upon a semicircle 25—26—27—28. The vector 24—25 represents, in phase and in magnitude, the load current of one phase of the motor 11 under 100% overload motoring, the vector 24—26 for full-load motoring, the vector 24—27 for no-load and the vector 24—28 for full-load recuperation. In like manner, the phase and magnitude of the load currents of another phase of the motor 11 may be indicated by the vectors 24—29, 24—30, 24—31 and 24—32, respectively, and, in the remaining phase, by the vectors 23—33, 24—34, 24—35 and 24—36, respectively. For 100% overload-current motoring, the cumulative reactive drops through the phase converter may be indicated by a vector 23—37, perpendicular to the vector 24—25 and the cumulative resistance drop by a vector 37—38, parallel to the vector 24—25. Thus, at 100% overload motoring, the apex of the polyphase voltage triangle moves to the point 38 and would result in serious unbalancing of the electromotive forces on the motor 11 were it not for the effects of the inductive devices 18 and 19. For full-load motoring, the apex of the voltage triangle assumes a position 39, for no-load, a position 40, and a full-load recuperation position 41.

At 100% overload motoring, the effect of the relatively large reactor 19 is to produce a reactive drop represented by a vector 21—42, perpendicular to the vector 24—29, thus shifting the location of the point 21 to the point 42. The effect of the reactor 19, at other conditions of load, is to produce drops represented by the vectors 21—43, 21—44 and 21—45, respectively, so that the point 21 assumes the position 43 at full-load motoring, the position 44 at no-load and the position 45 at full-load recuperation.

In like manner, the effect of the small reactor 18 is to produce a reactive drop represented by a vector 20—46, at 100% overload motoring, said vector being perpendicular to the current vector 24—33 and causing the point 20 to move to the position 46. In like manner, the point 20 assumes the position 47 at full-load motoring, the position 48 at no-load and the position 49 at full-load recuperation.

Turning now to a discussion of the general principles underlying the problem of maintaining a desirable voltage balance, it is obvious that, by inserting resistance and inductive reactance in each of the mains 16 and 17, corresponding to the resistance and inductive reactance of the phase converter 12, the drops 23—38, 23—39, 23—40 and 23—41 could be duplicated for the other two vertices of the main three-phase-voltage triangle and the points 21 and 20 caused to be displaced by an amount similar to that indicated for the point 23. In this way, the voltage balance would be maintained, although at the expense of an unnecessary reduction in the output voltage and also of marked energy loss in the ohmic resistance thus introduced. By the use of unequal reactances in the outside supply mains, as indicated, the resistance drops operating to change the location of the points 20 and 21 are negligible, and only reactance drops need to be considered in connection therewith. The three-phase-voltage triangle in Fig. 3 may be considered as tending to pivot about the point 20 while changing in magnitude, the apex moving through a major distance and the point 21 moving through an intermediate distance. While it is true that there is no strict pivoting about the point 20, in that said point does move somewhat, it is nevertheless true that the motion thereof is less than that of the point 21, the motion of which is less than that of the apex 23. By the appropriate choice of the amount of reactance in the devices 18 and 19 and of the voltage induced in the tertiary winding 15 in excess of 87% of the primary winding of the phase converter, the triangles 38—42—46, 39—43—47, 40—44—48 and 41—45—49 may all be caused to be so nearly equilateral as to come within the commercial requirements of voltage balance.

The phase-converter 12 in the system of Fig. 1 is of the asynchronous type. It has also been proposed to employ phase converters of the synchronous type so that the power factor of the entire system may be controlled and improved by over-excitation of the synchronous phase converter, as is well known and understood. A system of this type is shown in Fig. 2, it being the same as that shown in Fig. 1 except that an additional winding 50 is placed upon the rotor of the phase converter 12 and is arranged to be excited from a source of direct current 51. For a vector treatment of the resultant control of the polyphase voltage balance over a wide range of load change, attention is directed to Fig. 4 wherein the main vectors are as indicated in Fig. 3. The effect of the over-excitation of the secondary member of the phase converter is to produce leading wattless current which may be represented, in phase and magnitude, by a vector 24—52. The watt or energy currents produce drops in all the phase-converting windings. The leading wattless current represented by the vector 24—52 produces drops principally in the primary winding 13 and partially in the secondary windings of the converter 12, whereas the lagging wattless components of the motor currents represented by the vectors 24—25, 24—26, 24—27 and 24—28 produce drops principally in the tertiary winding 15, although also partially in the secondary windings of the phase converter. Thus, the equivalent currents supplied from the phase converter for the different conditions of load may be represented by vectors 24—53, 24—54, 24—55 and 24—56, respectively. The construction of the vector 24—53 in accordance with the above is obvious, its wattless current component being the algebraic sum of one-half the vector 24—52 and the wattless component of the vector 24—25 and its energy component being the same as that of the vector 24—25. The ohmic and reactive drops in the phase-converter are plotted from the vertex 23, as in Fig. 3, with the exception that they are taken perpendicular or parallel to the current vectors 24—53 to 24—56, inclusive, respectively, rather than the vectors 24—25 to 24—28, inclusive, as in Fig. 3.

The reactive drops 21—42 to 21—45, inclusive, and 20—46 to 20—49, inclusive, are as in Fig. 3. By choosing the vertex 23 somewhat below and to the left of the apex of an equilateral triangle constructed on the base 20—21, that is, by inducing an electromotive force in the tertiary winding 15 somewhat less than 87% of the voltage impressed upon the primary winding 13 and by connecting the terminal of the winding 15 slightly off the center of the source 10, a more desirable voltage balance is maintained.

It may frequently be undesirable to induce less than 87% of the primary voltage in the tertiary winding 15 and to connect the tertiary winding 15 off the center of the primary winding 10 and, under these conditions, I may produce the effect of said unsymmetrical connection by placing a small inductive device in the lead connected to the tertiary winding. Thus, in the system of Fig. 5, an inductive reactor 57 is connected in series with the tertiary winding 15. The vector diagram, under these conditions, is substantially the same as that shown in Fig. 4, the effect of the reactor 57 tending to locate the vertex of the equilateral triangle at the point 23, as is desired.

In the systems described to this point, the inductive reactor located to affect the load phase immediately leading the electromotive force of the single-phase source has been greater than that located to affect the load phase immediately following the electromotive force of the single-phase supply. Obviously, if the direction of phase rotation of the load system be reversed, the relative magnitude of the two reactors would be in the wrong direction and it would therefore be necessary to provide means whereby, upon a reversal of the phase rotation in the output end of the phase converter system, said relative magnitude relation should also be reversed.

Furthermore, up to this point, the compensation that has been effected has served principally to correct the unbalancing caused by the reactive drops, the unbalancing caused by the resistance drops being more difficult to control by the use of reactors in the supply leads. It is generally more convenient to compensate for the resistance drops under varying degrees of load by the adjustment of the taps supplying the phase converter.

A system operating in accordance with both of the above principles is indicated in Fig. 6. A source of single-phase current 10 is arranged to supply a polyphase induction motor 11 through a phase converter 12, as before. One point of attachment of the primary winding 13 to the supply winding 10 is adjustable, as shown at 60, and said point of attachment may be varied automatically by the operation of an induction motor 61 operated by voltage unbalance in the system as follows. An induction machine 62 is provided having a secondary winding 63 connected to energize the primary winding of the motor 61. The primary winding 64 of the motor 62 is connected to be energized by current transformers 65—66—67 arranged in the respective polyphase supply leads. The induction machine 62 is running light and, therefore, when the currents in the different supply leads of the motor 11 are in balance, the currents circulating in the secondary winding 63 are very small, being insufficient to operate the motor 61. Upon an unbalancing of the current in the supply mains of the main motor 11, the currents supplied and the primary winding 64 are unbalanced and the secondary winding 63 tends to produce a balance thereof in accordance with the well known balancing action of a polyphase induction machine. As a result, circulating currents flow through the primary winding of the motor 61 sufficient to cause the operation thereof and the adjustment of the point 60. By suitable design of the apparatus, the point 60 may be correctly adjusted, either to the right or to the left, for appropriate correction of the unbalancing.

Turning now to the reversal of phase rotation and the attendant reversal of the motor 11, a reversing switch 68 is provided for interchanging the terminals of the tertiary windings 15. Thus, the direction of phase rotation in the polyphase system is reversed without affecting the phase converter itself. A like result may be attained by reversing the connections of the primary winding of the phase-converter. Furthermore, by locating the current transformer 66 between the reversing switch 68 and the tertiary winding 15, the reversal of the phase rotation does not affect the operation of the automatic adjusting device 62—61. In like manner, limit switches or other pieces of control apparatus, which should be undisturbed in operation by a reversal in phase rotation, may be located similarly to the current transformer 66.

The inductive reactors 18 and 19 may have adjustable movable core members which are connected together, as by a link 69. As shown, with the reversing switch 68 thrown to the left, the link 69 is also thrown to the left so that the entire core member of the reactor 18 is active, whereas, a portion of the core member of the reactor 19 is withdrawn from the solenoid and is, accordingly, inactive. Thus, for the particular direction of phase rotation indicated by the position of the switch 68, the reactance of the device 18 preponderates over that of the device 19.

Upon throwing the reversing switch 68 to the right, for the reversal of the phase rotation, the link 69 should also be thrown to the right, introducing the core member of the device 19 and withdrawing the core member of the device 18, thus causing the inductive reactance of the device 19 to preponderate over that of the device 18. This reactance controlling device is merely illustrative of many possible structures capable of producing the same result and I do not desire to be restricted to the specific structure shown.

With all of the foregoing systems, the voltage balance in the polyphase system will be somewhat better than that indicated in the vector diagrams, by reason of the inherent balancing action of the polyphase induction motor 11.

While I have shown my invention in a plurality of preferred forms it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a three-phase system and a single-phase system, of a dynamo-electric phase converter for effecting an energy interchange between said systems, one phase of said three-phase system being directly coupled to said single-phase system, the other phases of said three-phase system being derived from said single-phase system through said phase converter, and means for producing independent reactive drops in said last-mentioned phases of said three-phase system.

2. The method of improving the balance of the output electromotive forces of a phase-converter system wherein three-phase currents are derived from a single-phase source by a rotary phase-converter, one phase being derived directly from said source and being in phase therewith, which comprises producing unequal reactive drops in the two load phases which are out of phase with said source, the reactive drop in the phase immediately leading said source in phase exceeding that in the phase immediately following said source in phase.

3. The combination with a phase converter system comprising a source of single-phase electromotive force, of a rotary phase converter having its inducing winding connected thereto, a polyphase load circuit having certain of its mains connected directly to said source and having another main connected to be energized from the induced winding of said converter and inductive devices of unequal reactance in two of said directly connected load-circuit mains.

4. The combination with a phase-converter system comprising a source of single-phase electromotive force, of a rotary phase converter having its inducing winding connected thereto, a polyphase load circuit having certain of its mains connected directly to said source and having another main connected to be energized from the induced winding of said converter, and inductive devices of unequal reactance in two of said directly connected load-circuit mains, the reactance of the inductive device in the phase immediately leading said source in phase exceeding that in the phase immediately following said source in phase.

5. In a phase-converter system, a source of single-phase alternating current, a polyphase load circuit, connections from said source directly to certain leads of said load circuit, a phase-converter of the rotary type having its primary winding connected across said source and having its tertiary winding connected between an intermediate point in said source and a third load main, means for automatically adjusting the point of attachment of said tertiary winding to said source in accordance with the load current, and means for developing unequal inductive reactances in the phases of said load circuit which are out of phase with said source, the reactance in the phase immediately leading said source in phase exceeding that in the phase immediately following said source in phase, whereby substantial load balance may be maintained in said load circuit under varying load.

6. The combination with a phase-converter system embodying a single-phase source, a three-phase load circuit, a rotary phase-converter, two mains of said load circuit being connected directly to said source and the third main being energized from the tertiary winding of said phase converter and unequal inductances inserted in the mains connected directly to said source, of means for reversing the direction of phase rotation in said load circuit, and means for reversing the inequality of said inductances.

7. The combination with a phase-converter comprising a primary stator winding, a rotatable secondary winding, and a tertiary stator winding electrically displaced from said primary winding, of a source of alternating current, a polyphase load circuit, connections from the terminals of said source to certain of the mains of said load circuit, connections for inserting said tertiary winding between an intermediate point in said source and a main of said load circuit, means for reversing said tertiary winding in said last-named connections, whereby the direction of phase rotation in said load circuit may be reversed, inductive devices of unequal reactance in the two mains directly connected to said source, and means for reversing the inequality of said devices.

8. Means tending to maintain the balance of a phase-converter system embodying a single-phase alternating-current source, a polyphase load circuit, and a rotary-phase converter, said phase-converter embodying a primary winding connected across said source and a tertiary winding connected between an intermediate point in said source and a main of said load circuit, comprising an auxiliary polyphase induction machine having primary and secondary windings and having its primary winding connected to be energized in accordance with the currents in said polyphase load circuit, an electromotor device arranged to adjust the point of attachment of said tertiary winding to said source, and means for energizing said device in accordance with the currents flowing in the secondary winding of said auxiliary induction machine.

9. The combination with a source of single-phase alternating current, of a phase-converter of the dynamo-electric machine type embodying primary, secondary and tertiary windings, a polyphase load circuit, a connection from said source through said tertiary winding to a point in said load circuit, means for interchanging the terminals of said tertiary winding in said connection, whereby the phase of the electromotive force induced therein is reversed with respect to the primary electromotive force, and translating devices which it is desired shall be unaffected by a reversal of the direction of phase rotation in said polyphase circuit connected between said tertiary winding and said terminal interchanging means.

In testimony whereof, I have hereunto subscribed my name this 28th day of June, 1917.

RUDOLF E. HELLMUND.